United States Patent Office 2,839,549
Patented June 17, 1958

2,839,549
BODIED RESINOUS POLYAMIDES

Gerald G. Wilson, Kankakee, Ill., assignor to General Mills, Inc., a corporation of Delaware No Drawing. Application November 18, 1953
Serial No. 393,018

7 Claims. (Cl. 260—404.5)

The present invention relates to new and valuable bodied resinous polyamides obtained by the condensation of polymeric fat acids with polyalkylene polyamines. These resinous polyamides are characterized by free titratable amine groups in the polyamide molecule, the free amine groups being the result of the use of an excess of the polyamine over the quantity equivalent to the acid groups in the polymeric fat acid. The polyamides are obtained by heating a mixture of the polymeric fat acid and the polyalkylene polyamine to effect substantially complete condensation and thereafter continuing the heat treatment for an extended period of time to effect a molecular rearrangement of the amide groups in a manner to be described hereinafter.

The polyamides of the present invention possess unusual physical properties which render them unusually valuable for adhesive, molding, potting and surface coating application. They have increased value in these applications because of the molecular rearrangement induced by the continued heat treatment. These improved properties include greater stability as regards melting point and solution viscosity, improved adhesive properties to metals and other nonporous surfaces and a greater impact resistance, toughness, and hardness when formulated for surface coating applications.

It is therefore an object of the present invention to provide novel bodied resinous polyamides obtained by the condensation of polymeric fat acids and polyalkylene polyamines, the condensation product being subjected to a heat treatment for an extended period of time to effect molecular rearrangement of the amide groups.

It is a further object of the present invention to provide a novel process of producing such bodied resinous polyamides.

The polyamides employed in the present invention are those derived from polymeric fat acids and polyalkylene polyamines. The polymeric fat acids are a mixture of dimeric and trimeric fatty acids resulting from the polymerization of drying or semi-drying oil or from the polymerization of the free acids or simple aliphatic alcohol esters of the acids of such oils as linseed, tung, perilla, oiticia, cottonseed, corn, tall, sunflower, safflower, and dehydrated castor oil. In the polymerization process the fatty acids with sufficient double bond functionality combine, for the most part, probably by a Diels-Alder mechanism to provide a mixture of dibasic and higher polymeric acids. The acids with insufficient functionality to react remain as monomers and may be removed by distillation. The residue after distillation consists of the desired polymeric acids and this mixture is used for the preparation of the polyamide resin. In place of this mixture of polymerized fatty acids it is possible to employ polymeric fat acids from any source or those which have been prepared by any polymerization process such, for example as the polymerization resulting from the use of a di-tertiaryalkyl peroxide, for example di-tertiary butyl peroxide as a catalyst. The invention contemplates the use of all polymeric fat acids, whether they are derived from unsaturated fatty acids or from saturated fatty acids and whether the polymeric acids are saturated or unsaturated.

Some of the monomer may be allowed to remain in the mixture of polymeric fat acid or additional monomer may be added for the purpose of controlling polymer size in accordance with known methods. The amount of monomer which is used in the polymeric fat acids depends upon the characteristics of the particular polyamide desired. In the process of forming the polyamide, either the free polymeric fat acids or any amide-forming derivative such as the lower alkyl esters may be used.

The polyalkylene polyamines which may be used are those which contain at least three amino groups separated by at least two alkylene groups. The preferred polyalkylene polyamines are those which contain only two primary amine groups, the rest of the amine groups being secondary. Suitable polyamines which may be used in the present invention include diethylene triamine, triethylene tetramine, tetraethylene pentamine, 3,3-iminobispropylamine and the like.

The ratio of equivalents of polyamine to equivalents of carboxyl should be such that cross-linking and hence gelation are avoided. For example in the case of diethylene triamine a ratio of 1½ equivalents of amine to 1 equivalent of carboxyl is preferred, taking into account the total carboxyl in the polymeric fat acid including the monomer as well as the higher polymers present. In the case of triethylene tetramine a higher amine ratio such as 2.6 equivalents of amine per equivalent of carboxyl is preferred. In general the higher the amine functionality of the polyamine the higher the ratio of amine equivalents per carboxyl equivalent that is required to produce a non-gelling polyamide. Accordingly, the particular excess of amine to be employed in each instance can readily be determined. Usually it is not necessary to go outside the range of 1.3–3.0 equivalents of amine per equivalent of carboxyl.

The reactants are reacted under suitable condensation conditions, usually at temperatures around 200° C. for a period of 2 to 4 hours. Typical reaction conditions are 200° C. for a period of 3 hours, the last hour of which the reaction mixture is maintained under a vacuum for the removal of water of reaction and other volatile material. During this reaction the condensation becomes substantially complete as is evidenced by a relatively low acid number, for example, an acid number of 10 or less. The other properties of the resin may vary depending upon the particular reactants.

The resin thus produced is then subjected to a bodying heat treatment which involves heating the resin at temperatures between approximately 200° C. and 300° C. At temperatures above 300° C. undue darkening and decomposition are likely to be encountered. The time period at this temperature may be varied, but generally is quite extended, for example, from 6 to 30 hours. This bodying treatment is accompanied by significant changes in the chemical and physical properties of the polyamide. There is relatively little further condensation of the polyamide since the acid number does not change appreciably. In the original condensation, contrary to what might be expected, it is found that a significant number of secondary amine groups become involved in the amide formation. In view of the increased reactivity of the primary amine groups one might expect that practically all of the primary amine groups would be involved in amide formation with only an insignificant amount of secondary amines being thus involved. Actually while the primary amine groups are amidified to a greater extent than the secondary amine groups there are still a significant number of secondary amine groups which react. Under the conditions of the bodying treatment, however, it is found that the number of free secondary amine groups in the polyamide increases materially while the number of free primary amine groups decreases materially. Apparently, therefore, the bodying involves some amide interchange such that there is a material decrease in the number of free primary amine groups whereas there is a material increase in the number of free secondary amine groups.

This change in the ratio of free secondary amine groups to free primary amine groups is also accompanied by an increase in the viscosity of the resin. This increase in viscosity is approximately 1–2 letters on the Gardner-Holdt viscosity scale as determined on a 35% solution in butanol-toluene, 1:1. The viscosity increase in the resin itself is approximately 200 centipoises on the Brookfield scale using a #4 spindle at 20 R. P. M. at 370° F.

Example 1

584 g. polymeric fat acids, 52.5 g. of monomeric unsaturated fatty acids and 113.1 g. of diethylene triamine (approximately 97%) were placed in a reaction vessel. The reaction vessel was heated to 200° C. with agitation for a total of 3 hours the last hour of which the vessel was placed under a vacuum equivalent to 12 mm. of mercury absolute pressure. The resulting polyamide had the following properties:

| | |
|---|---|
| Viscosity (Gardner-Holdt) | "B–C" |
| Ball and ring softening point °C | 57.8 |
| Amine No | 98.2 |
| Acid No | 8.8 |
| Percent primary amine | 38.7 |
| Percent secondary amine | 61.3 |

This polyamide was then heated at 200° C. for 19 hours additional under vacuum. At the end of this period the polyamide had the following properties:

| | |
|---|---|
| Viscosity (Gardner-Holdt) | "D–E" |
| Ball and ring softening point °C | 61.7 |
| Amine No | 95.1 |
| Acid No | 2.7 |
| Percent primary amine | 15.4 |
| Percent secondary amine | 84.6 |

This polyamide was then formulated into an adhesive for metal. The bonds from this adhesive were measurably stronger than bonds from an adhesive which contained an unbodied polyamide of the same viscosity, wherein this viscosity was attained by a slight adjustment in the proportion of reactants. Thus a polyamide that has attained a given viscosity as a result of a bodying treatment subsequent to the condensation reaction possesses superior properties as compared to the identical unbodied polyamide and as compared to a polyamide which has attained the same viscosity during the condensation reaction through the use of modified reactant ratios.

Example 2

7,615 pounds of polymeric fatty acids, 456 pounds of monomeric unsaturated fatty acids and 1520 pounds of diethylene triamine were placed in a reaction vessel. The reaction vessel was heated to about 200° C. and held there for about 3 hours, the last hour of which the vessel was maintained under a vacuum. The product thus obtained had a B–C Gardner-Holdt viscosity. The resin was maintained in the reaction vessel at approximately 200° C. for approximately 7 hours additional at which time it had a C–D viscosity. This product was formulated into an adhesive and was found to have better adhesive properties than an adhesive prepared from a similar resin which had not been subjected to bodying treatment.

Example 3

28.5 pounds of dimer fatty acids, 9.4 pounds of triethylene tetramine were placed in a reaction vessel and the vessel heated to 200° C. and held at that temperature for a total period of 3 hours, during the last two hours of which the vessel was maintained under vacuum. The vessel was then cooled to 175° C. and the product discharged under an inert atmosphere. This product had the following characteristics:

| | |
|---|---|
| Viscosity, Gardner-Holdt | A–2 |
| Acid No | 5.5 |
| Amine No | 221.7 |
| Percent primary amine | 51.1 |
| Percent secondary amine | 48.9 |

This product was then heated to 200° C. under a vacuum of 10 mm. with agitation for 10½ hours. At this point the product had the following properties:

| | |
|---|---|
| Viscosity, Gardner-Holdt | A–1 |
| Acid No | 3.5 |
| Amine No | 208.4 |
| Percent primary amine | 49.5 |
| Percent secondary amine | 50.5 |

The product was then bodied further. It was heated to a temperature of 200–210° C. for an additional 12 hours under a vacuum of 15 in. of mercury, with agitation. Thereafter the product had the following characteristics:

| | |
|---|---|
| Viscosity, Gardner-Holdt | B–C |
| Amine No | 205 |
| Acid No | 4.7 |
| Percent primary amine | 39.7 |
| Percent secondary amine | 60.3 |

The time require for bodying will depend upon the particular temperature employed and upon the particular polyamine used in making the polyamide. Thus in the case of a polyamide derived from polymeric fat acids and diethylene triamine a heating period from 10 to 20 hours at 200° C. may be suitable to body the polyamide through 2 Gardner-Holdt viscosity units. If the temperature is raised to 250° C. this bodying time may be reduced to approximately 7½ hours. With polyamides derived from other polyamines the time required for bodying may be longer or shorter depending on characteristics of the polyamine. For example with triethylene tetramine a time period of from 10 to 30 hours is suitable. It is impossible to specify the exact time which would be required at each temperature and for each particular polyamine. However, in view of the above considerations it is readily possible to determine the particular temperature and time to be employed for any given polyamine and for any desired end product.

The particular viscosity to which a product is to be bodied likewise may depend upon the particular use of the product. Thus in Example 1, the polyamide was bodied to a D viscosity from a B viscosity. This polyamide is particularly useful as a metal cement. In other applications such as for protective or decorating coatings frequently lower viscosities are desired. Accordingly the final viscosity may be a C viscosity prepared starting with a polyamide of initial viscosity of A or lower.

I claim as my invention:

1. A polyamide resin containing the polyacyl group of a polymeric fat acid and the polyamino group of a polyalkylene polyamine, the polyamide containing from 1.3 to 3.0 amino groups per carboxyl group and having been subjected to a bodying treatment at 200–300° C. for a period of from 6–30 hours to effect an increase in viscosity, said polyamide resin having an acid number of not greater than 10 before said bodying treatment.

2. A polyamide resin containing the polyacyl group of a polymeric fat acid and the polyamino group of diethylene triamine, the polyamide containing approximately 1.5 amino groups per carboxyl group and having been subjected to a bodying treatment at approximately 200–

300° C. for from 6–30 hours to effect an increase in viscosity, said polyamide resin having an acid number of not greater than 10 before said bodying treatment.

3. A polyamide resin containing the polyacyl group of a polymeric fat acid and the polyamino group of triethylene tetramine, the polyamide containing approximately 2.6 amino groups per carboxyl group and having been subjected to a bodying treatment at approximately 200–300° C. from 6–30 hours to effect an increase in viscosity, said polyamide resin having an acid number of not greater than 10 before said bodying treatment.

4. A process of making a polyamide resin which comprises reacting a polymeric fat acid with a polyalkylene polyamine in the relative proportions such that there are from 1.3 to 3.0 amino groups per carboxyl group, until the reaction mixture has an acid number of not more than 10, thereafter subjecting the polyamide to a bodying treatment of from 200–300° C. for from 6–30 hours to effect an increase in viscosity.

5. Process of making a polyamide resin which comprises reacting a polymeric fat acid with a polyalkylene polyamine in the relative proportions such that there are from 1.3 to 3.0 amino groups per carboxyl group, at approximately 200° C. under a vacuum to produce a polyamide resin having an acid number of not greater than 10 and thereafter subjecting the polyamide to a bodying treatment at 200–300° C. for from 6–30 hours to effect an increase in viscosity.

6. Process of producing a polyamide resin which comprises reacting a polymeric fat acid and diethylene triamine in an equivalent ratio of approximately 1.5 equivalents of diethylene triamine per equivalent of fat acid, at approximately 200° C. for approximately 3 hours to produce a polyamide resin having an acid number of not greater than 10 and thereafter subjecting the polyamide resin to a bodying treatment at approximately 200° C. for from 10–20 hours.

7. The process of making a polyamide resin which comprises reacting a polymeric fat acid and triethylene tetramine in an equivalent ratio of approximately 2.6 equivalents of triethylene tetramine per equivalent of fat acid at a temperature of approximately 200° C. for approximately 3 hours to produce a polyamide resin having an acid number of not greater than 10 and thereafter subjecting the polyamide resin to a bodying treatment at approximately 200° C. of from 10–30 hours.

References Cited in the file of this patent

UNITED STATES PATENTS

| | | |
|---|---|---|
| 2,190,770 | Carothers | Feb. 20, 1940 |
| 2,249,686 | Dykstra | July 15, 1941 |
| 2,336,384 | Baker et al. | Dec. 7, 1943 |
| 2,450,940 | Cowan et al. | Oct. 12, 1948 |

OTHER REFERENCES

"Polyamide Resins From Dilinoleic Acid and Ethylenediamine, Molecular Weight-Viscosity Relationships," by R. H. Anderson and D. H. Wheeler, J. Am. Chem. Soc., vol. 70, pp. 760–763 (1948).

Flory: Principles of Polymer Chemistry, September 1953, pp. 89–90.